Oct. 11, 1966 D. F. JOSEPH 3,278,915

TWO CORE PER BIT MEMORY MATRIX

Filed Feb. 20, 1963 4 Sheets-Sheet 1

INVENTOR.
DAVID F. JOSEPH

BY

Carl V. Olson

ATTORNEY

INVENTOR.
DAVID F. JOSEPH
BY
Carl V. Olson
ATTORNEY

Oct. 11, 1966 D. F. JOSEPH 3,278,915

TWO CORE PER BIT MEMORY MATRIX

Filed Feb. 20, 1963 4 Sheets-Sheet 3

INVENTOR.
DAVID F. JOSEPH
BY
Carl V. Olson
ATTORNEY

INVENTOR.
DAVID F. JOSEPH
BY Carl V. Olson
ATTORNEY

United States Patent Office 3,278,915

Patented Oct. 11, 1966

3,278,915
TWO CORE PER BIT MEMORY MATRIX

David F. Joseph, Norwood, Mass., assignor to Radio Corporation of America, a corporation of Delaware Filed Feb. 20, 1963, Ser. No. 259,863
1 Claim. (Cl. 340—174)

This invention relates to memory systems, and particularly to random-access memory systems wherein two memory elements are employed for the storage of each information bit.

The use of two memory elements (such as ferrite cores) for the storage of each information bit can provide a higher speed of reliable operation than can be had with one memory element per bit. The increased speed results when the two memory elements are employed in such a way that unwanted noise signals from the two memory elements tend to cancel. The undesired noise signals are commonly of very much greater amplitude than the desired information signals. The reading (sensing) of information must be delayed until the system has recovered from the effects of noise occasioned by the preceding writing operation.

Random-access memories may be classified as word organized or coincident-current organized. The coincident-current organization is desirable because it involves less complex electronic circuitry for addressing any desired word location in the memory. While not necessarily limited thereto, the present invention is particularly useful as applied to coincident-current memories.

It is a general object of this invention to provide a random-access memory having improved noise-cancelling and operational-speed characteristics.

It is another object to provide a coincident-current memory capable of faster reliable operation than is provided by comparable known memories.

It is a further object to provide a memory which is less expensive to construct than comparable prior art memories by reason of being capable of employing less expensive memory elements and drive circuits in achieving a given speed of operation.

An example of a memory system according to the invention includes, for each digit of the words to be stored therein, a plurality of information memory elements equal to the number of words, a corresponding plurality of noise cancellation memory elements, write means for addressing any information memory element and the corresponding noise cancellation memory element, digit means coupled to all memory elements for determining the information written into the addressed information memory element and the corresponding noise cancellation memory element, read means for addressing solely any one information memory element, and sensing means coupled to all memory elements in a manner to provide cancellation of signals from information memory elements by signals from noise cancellation memory elements. The described scheme for one digit of the words may be extended to all digits of the words by providing additional digit means and sensing means for the additional digits and by arranging the write means and the read means to address all digits of a selected word.

DESCRIPTION OF SYSTEM OF FIG. 1

Figure 1:
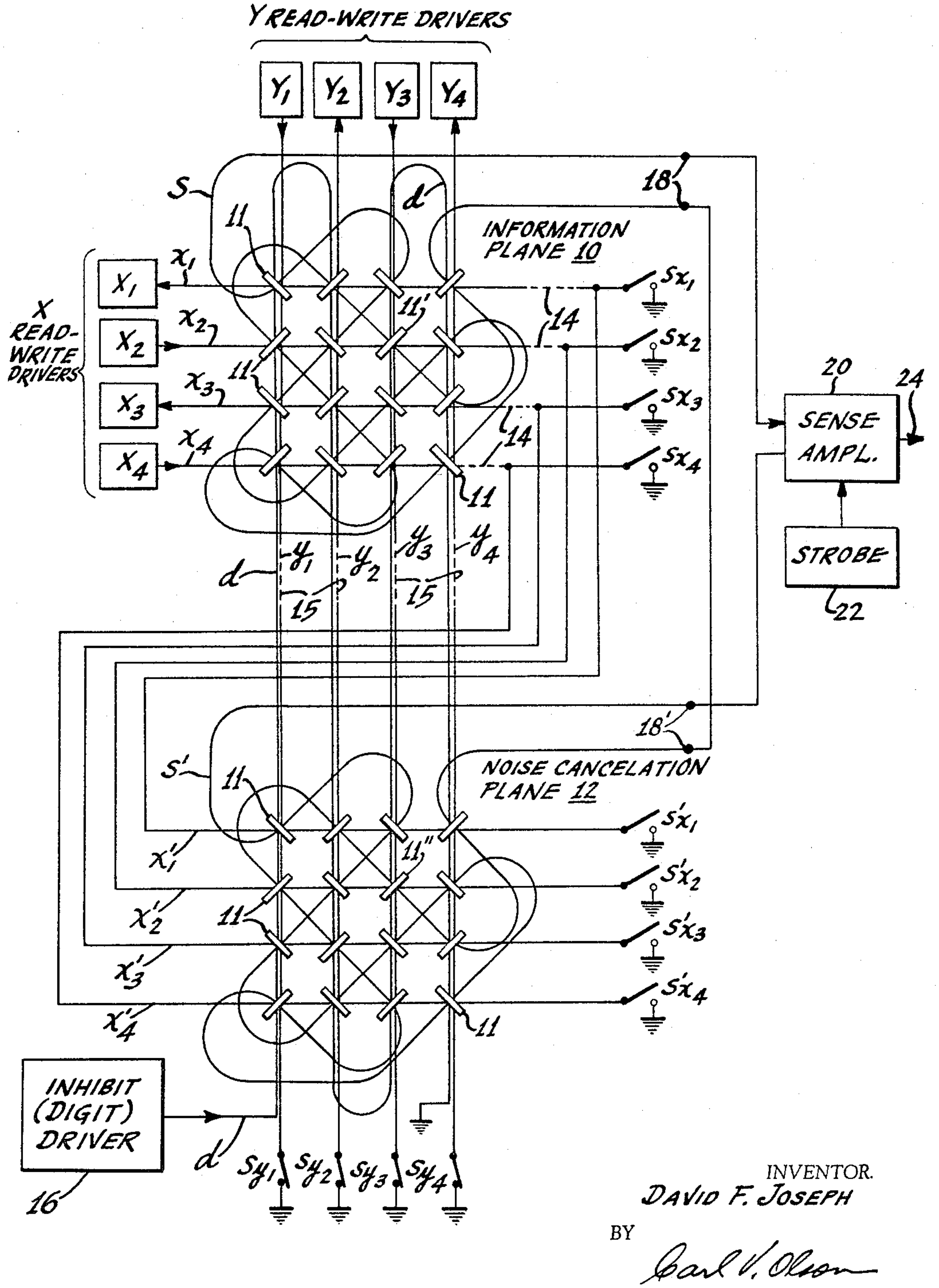
FIG. 1 is a diagram of an illustrative coincident-current, two-core-per-bit memory for the storage of sixteen corresponding information bits of sixteen different words.

Reference is now made in greater detail to FIG. 1 where there is shown a memory system including an information array or plane 10 of sixteen memory elements 11 and a similar noise cancellation array or plane 12 of sixteen memory elements. The memory elements may be ferrite cores. The memory elements of each plane are arranged in four rows and four columns. In actual practice, a much larger number of memory elements may be employed. There is some noise cancellation advantage which results from employing a given number of memory elements in a greater number of rows than columns.

Each of the rows of memory elements in information plane 10 is threaded by a respective row conductor $x_1$, $x_2$, $x_3$ and $x_4$, each of which are connected at one end to a respective X read-write driver $X_1$, $X_2$, $X_3$ and $X_4$. The other ends of the row conductors are connectable to ground or other return paths through respective switches $Sx_1$, $Sx_2$, $Sx_3$ and $Sx_4$. The row conductors are also continued or connected as conductors $x_1'$, $x_2'$, $x_3'$ and $x_4'$ through memory elements of corresponding rows in noise cancellation plane 12 to respective ground or return path switches $S'x_1$, $S'x_2$, $S'x_3$ and $S'x_4$. The arrangement described is one wherein a given X read-write driver will supply current to the corresponding row of memory elements in information plane 10 if the corresponding switch $Sx$ is closed, and will supply current to corresponding rows of both the information plane 10 and the noise cancellation plane 12 if solely the corresponding switch $S'x$ is closed.

The drivers and switches may be known transistor circuits. The switches $S'x$ are not necessary for an understanding of the invention since they could be replaced by permanent ground connections. However, the switches $S'x$ are shown in the drawing because it is usual practice in memories to select a given row conductor by simultaneously energizing a driver common to one end of a plurality of the lines and a switch common to the other end of a different plurality of the lines but having the one selected line in common. The usual selection arrangement requires less electronics than the simplified arrangement illustrated in FIG. 1.

Y read-write drivers $Y_1$, $Y_2$, $Y_3$ and $Y_4$ are connected to corresponding column conductors $y_1$, $y_2$, $y_3$ and $y_4$ which link corresponding columns of cores in both information plane 10 and noise cancellation plane 12. Each column conductor is connected at its other end to a respective switch $Sy_1$, $Sy_2$, $Sy_3$ and $Sy_4$. Switches $Sy$, like switches $S'x$, may be considered as permanently closed for the purpose of understanding the invention. The portions 14 of the $x$ conductors and the portions 15 of the $y$ conductors are shown by broken lines to indicate that these portions of the conductors may extend through other information and digit planes in a three-dimensional memory after the manner illustrated in FIG. 6.

In FIG. 1, a digit conductor $d$ is threaded through all memory elements of both information plane 10 and noise cancellation plane 12. The digit conductor is connected at one end to an inhibit or digit driver 16, and is connected to the opposite end to a return path such as ground. The conductors $x$, $y$ and $d$ are provided with arrowheads indicating relative polarities or current directions in accordance with a scheme wherein each memory element or core can receive $x$ and $y$ "write" current pulses in the same sense or direction, and can receive an inhibit or digit current pulse in the opposite sense or direction.

A sense conductor $s$ is wound in a diagonal fashion through the memory elements of information plane 10 and is wound in the same fashion, as a conductor $s'$ through the memory elements of noise cancellation plane 12. The terminals 18 of the sense conductor $s'$ are connected together and to the input of a sense amplifier 20 in such a way that signals induced in the sense conductor $s$ are cancelled by signals induced in sense conductor $s'$ if equal signals are simultaneously induced in the sense conductors $s$ and $s'$. Stated another way, the sense conductors $s$ and $s'$ are wound and connected in series opposition to provide a cancellation of signals from the information plane 10 by signals from the noise cancellation plane 12. The sense amplifier 20 is supplied with the usual strobe pulse from a strobe source 22 when it is desired to read out a sensed "1" or "0" from the output 24 of the sense amplifier.

Other configurations of the digit conductor $d$ and the sense conductors $s$ and $s'$ may be employed provided that the general relative relationships described are maintained. Digit and sense conductors are usually arranged so that noise signals induced on the sense conductor of a digit plane due to passing a digit current through all the memory cores of the plane tend to cancel. This is accomplished by using a digit and sense winding arrangement wherein the disturbances from one half of the cores is induced in one polarity on the sense winding, and the disturbances from the other half of the cores is induced in the opposite polarity on the sense winding. The present invention provides this known digit noise cancellation, and provides an additional cancellation of digit noise not obtainable according to prior arrangements. The additional digit noise cancelled according to this invention is a noise which varies in amplitude in accordance with the pattern of "1" and "0" information in a digit plane.

The X and Y read-write drivers when in the write mode, the switches $Sx$ when open and the switches $S'x$ when closed, together with the $x$ and $y$ conductors, constitute a write means for addressing any one memory element in the information plane 10 and for addressing the corresponding memory element in the noise cancellation plane 12.

The X and Y read-write drivers when in the read mode, the switches $Sx$ when closed, and the $x$ and $y$ conductors constitute a read means for addressing any one memory element in solely the information plane 10.

CLEAR AND WRITE OPERATION OF SYSTEM OF FIG. 1

The operation of the memory system of FIG. 1 will now be described with references to the waveforms of FIG. 2. The drive waveforms are idealized and the sense winding signal waveforms closely approximate waveforms actually observed. When it is desired to write information into a particular memory element, for example, element 11' of the second row, third column, a clear and write cycle of operation is performed with the particular row switch $Sx_2$ open and the corresponding row switch $S'x_2$ closed, as illustrated by the left-hand half of waveforms $a$ and $b$ of FIG. 2. During the "clear" portion of the cycle, the appropriate X read-write driver $X_2$ is energized causing an X read (clear) pulse 26 (FIG. 2$c$) to go through the memory element 11' in the information plane 10 and through the memory element 11'' in the noise cancellation plane 12. Simultaneously, the Y read-write driver $Y_3$ is energized causing a current as represented by the pulse 28 (FIG. 2$d$) to flow in the same direction through memory elements 11' and 11''. The drivers $X_2$ and $Y_3$ constitute means for addressing the memory elements 11' and 11'' in planes 10 and 12.

If the elements 11' and 11'' previously were storing a "1", the X read pulse 26 and the Y read pulse 28 together have an amplitude sufficient to cause the elements 11' and 11'' to switch to saturated magnetic conditions representing a "0." The switching of the elements causes a pulse 30 (FIG. 2$f$) to be induced in sense conductor $s$ of information plane 10 and a pulse 30' (FIG. 2$g$) to be induced in sense conductor $s'$ of cancellation plane 12. The sense signals 30 and 30' are cancelled in the sense windings $s$, $s'$ so that no signal (FIG. 2$h$) is applied to the sense amplifier 20.

If the elements 11' and 11'' were storing a "0" when the $x$ and $y$ pulses 26, 28 are applied, the elements are merely driven further into saturation in the "0" direction. This causes a small change in flux which induces small $x$ and $y$ noise signals 32 and 32' in sense windings $s$, $s'$ which are cancelled (FIG. 2$h$) prior to application to sense amplifier 20.

During the "write" portion of the clear and write cycle, a "1" is written by supplying pulses 34 and 36 to the memory elements 11' and 11'' from the drivers $X_2$ and $Y_3$. In the absence 38 of a digit pulse (FIG. 2$e$), the pulses 34 and 36 cause a "1" to be written into the information memory element 11' and cause a "1" to be written into the noise cancellation memory element 11''. The switching of the elements causes opposite polarity pulses 40, 40' to be induced in sense windings $s$, $s'$ where they are cancelled and do not appear at the sense amplifier 20.

If a "0" is to be written, X and Y pulses 34, 36, and also an inhibit or digit pulse 42 of opposite polarity, are supplied to elements 11, 11''. The digit pulse 42 opposes and cancels half of the sum of the X, Y pulses 34, 36, leaving a half-select pulse amplitude which is insufficient to switch the memory elements. Half-select noise signals 44, 44' cancel each other.

Figure 3:
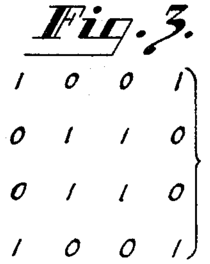
FIG. 3 illustrates a pattern of information stored in the memory of FIG. 1 which results in "worst case" digit noise.

When writing a "0," the inhibit pulse 42 is applied to all memory elements 11 in the information plane 10 (as well as all memory elements in noise cancellation plane 12). As is usual and known, the digit winding $d$ and the sense winding $s$ are threaded in such a manner that digit noise signals induced in the sense winding from half the memory elements are of cancelling polarity compared with digit noise signals induced from the other half of the elements. However, the amplitude of digit noise from a particular memory element depends on whether it is storing a "1" or a "0." Therefore, the extent of digit noise cancellation depends on the pattern of "1's" and "0's" stored in the digit plane. The digit noise is cancelled if all elements store "0's" or if all elements store "1's." Various patterns of an equal number of "1's" and "0's" result in digit noise amplitudes varying from almost perfect cancellation to worst case maximum digit noise. The winding arrangement of FIG. 1 has a worst case information pattern as illustrated by FIG. 3, or its complement. Since the use of a memory may result in a worst case pattern, the memory should be designed to be operative under the worst case condition.

Figure 4:
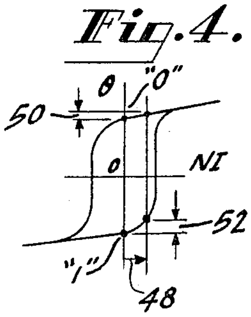
FIG. 4 is a diagram of flux vs. magnetizing force which will be referred to in describing the cause of digit noise in the memory of FIG. 1.

The reason why the digit noise from a particular memory element depends on whether it is storing a "1" or a "0" is illustrated by the magnetic hysteresis loop characteristic of FIG. 4 where the flux condition at the top of the loop represents the storage of a "0" and the flux condition at the bottom represents the storage of a "1." A digit pulse causes a magnetizing force 48 in the "0" direction which results in a flux change 50 in an element storing a "0," and a flux change 52 in an element storing a "1." Because of the curvatures (lack of squareness) of the hysteresis loop, the digit pulse causes more noise in an element storing a "1" than in an element storing a "0". Although the difference in digit noise from a core storing a "1" and a core storing a "0" is quite small, there normally are a great number of cores in a digit plane all of which are supplied with the same digit pulse. The many small noise signals due to the digit pulse can add up to a very large noise signal on the sense line.

A memory system according to the invention can provide a given speed of reliable operation using ferrite core memory elements having a relatively poor squareness in their hysteresis loop characteristic. The greater noise generated as the result of using poorer cores is cancelled. Such cores are less expensive to construct and assemble, and require smaller drive currents to cause them to switch. The saving in the cost of cores (even though twice as many are used) and the saving in the electronics, permit a given memory speed performance to be obtained more economically than can be obtained with comparable prior art arrangements.

Figure 2:
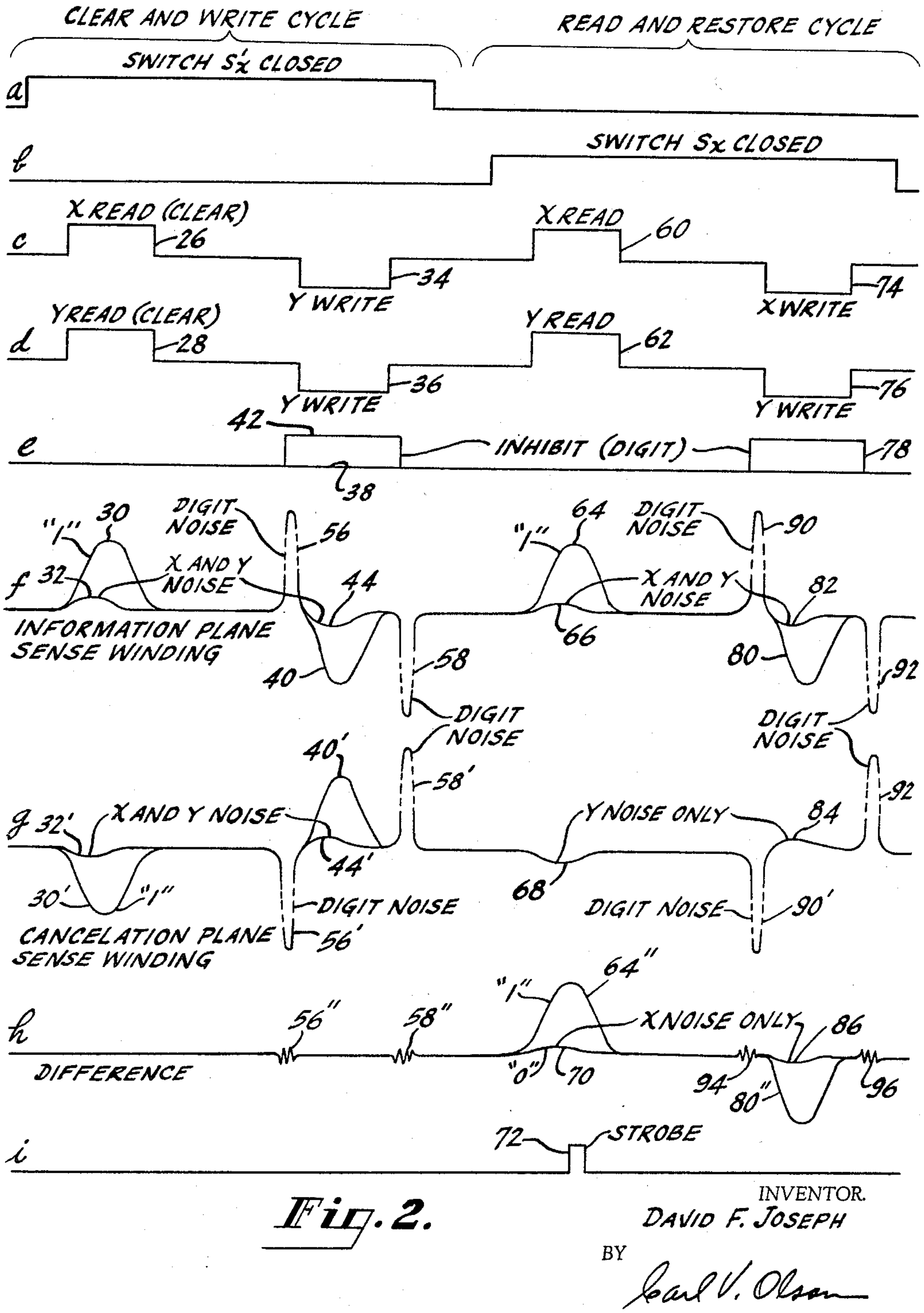
FIG. 2 is a series of waveforms which will be referred to in describing the operation of the system of FIG. 1 in the clear and write mode, and in the read and restore mode.

In waveform *f* of FIG. 2, the digit noise signals 56, 58 appearing at the leading and trailing edges of the digit pulse 42 have an amplitude, represented by broken lines, which varies from a low amplitude to a very high amplitude depending on the pattern of "0" and "1" information in the information digit plane 10. Since the same information pattern exists in the noise cancellation plane 12, nearly equal and cancelling digit noise signals 56', 58' of FIG. 2*g* are generated in the noise cancellation plane 12. Regardless of the amplitude of the digit noise, only minor perturbations 56'' and 58'' (FIG. 2*h*) reach the sense amplifier.

The cancellation of digit noise is accomplished, according to the invention, by the use of an information plane 10 and a noise cancellation plane 12. This cancellation of noise reduces the necessary recovery time which must be allowed before the next following "read" operation can be performed. Therefore, the memory of the invention is capable of considerably faster operation than comparable prior art arrangements.

READ AND RESTORE OPERATION OF SYSTEM OF FIG. 1

The clear and write cycle of operation which has been described is performed with an X read-write driver coupled through a row of the information plane 10 and also through the corresponding row in noise cancellation plane 12. The read and restore cycle of operation, to be described, differs in that an X read-write driver is connected through solely the information plane 10 to ground through a switch S*x*. During the read portion of the read and restore cycle, solely the information plane 10 is addressed by an X driver and a Y driver. The noise cancellation plane 12 is not addressed because, while it receives a pulse from a Y driver, the Y pulse is not of sufficient amplitude alone to perform reading or writing in the noise cancellation plane. Since only the information plane 10 is addressed, a sense signal appears only in the sense winding *s* of plane 10. No information sense signal appears on the sense winding *s'* of cancellation plane 12. However, noise signals are induced on sense conductor *s'* which cancel corresponding noise signals induced on the information sense conductor *s*.

During the read portion of the read and restore cycle, X and Y read pulses 60, 62 address one of the memory elements in the information array 10 to provide a "1" output 64 if the element was storing a "1," and induces a noise output 66 if the element was storing a "0." Solely the Y pulse 62 is applied to memory elements in the noise cancellation plane 12 with the result that a noise signal 68 is generated in the sense winding *s'*. If the memory element addressed was storing a "1," the "1" signal 64, as represented by the pulse 64'' in FIG. 2*h*, is applied to the sense amplifier 20. If the memory element addressed in the information plane 10 was storing a "0," the X and Y noise 66 information plane 10 is partially cancelled by the Y noise 68 in noise cancellation plane 12. The resulting difference noise signal 70 is easily distinguished from the "1" signal as representative of a stored "0." At a favorable time during the presence of the "1" pulse 64'' or the "0" pulse 70, the sense amplifier 20 is supplied with a strobe pulse 72 which energizes it and permits it to provide an output signal from output lead 24.

During the "restore" portion of the read and restore cycle, the X and Y pulses 74, 76 are applied to a memory element in the information plane 10 to write a "1." It is not necessary to rewrite the information into the noise cancellation plane 12 because the information is still present there, since it was not destroyed by being read out. The writing of a "1" in information plane 10 causes the inducing of a signal 80 in the sense conductor *s*, but does not result in any corresponding signal in the unaddressed noise cancelling plane 12. Therefore, the signal 80 is not cancelled but is applied as a noise pulse 80'' (FIG. 2*h*) to the unstrobed and inactive sense amplifier 20.

When restoring a "0," the digit conductor *d* is also energized by a digit pulse 78 applied to both the information plane 10 and the noise cancellation plane 12. The X and Y write pulses 74, 76 are thus inhibited from switching the addressed memory element, but they result in a noise signal 82 in the information plane 10 which is partially cancelled by the Y noise pulse 84 in the cancellation plane 12. Only the resulting difference signal 86 reaches the sense amplifier 20. Since the noises 70 and 86 are uncancelled noises caused solely by the X driver, the noises can be reduced by employing a given number of memory elements in a plane with a greater number of rows than columns.

The leading and trailing edges of the digit pulse 78 applied to both information and cancellation planes 10, 12 when writing a "0" into an addressed memory element results, as before, in digit noise pulses 90, 92 in plane 10 and digit noise pulses 90', 92' in plane 12. The amplitudes of the digit noise pulses depend on the identical patterns of information stored in the planes 10 and 12. In any event, the digit noise pulses on the sense windings in the two planes are substantially equal and cancel so that only modest perturbations 94 and 96 reach the sense amplifier 20.

READ AND WRITE OPERATION OF SYSTEM OF FIG. 1

Figure 5:
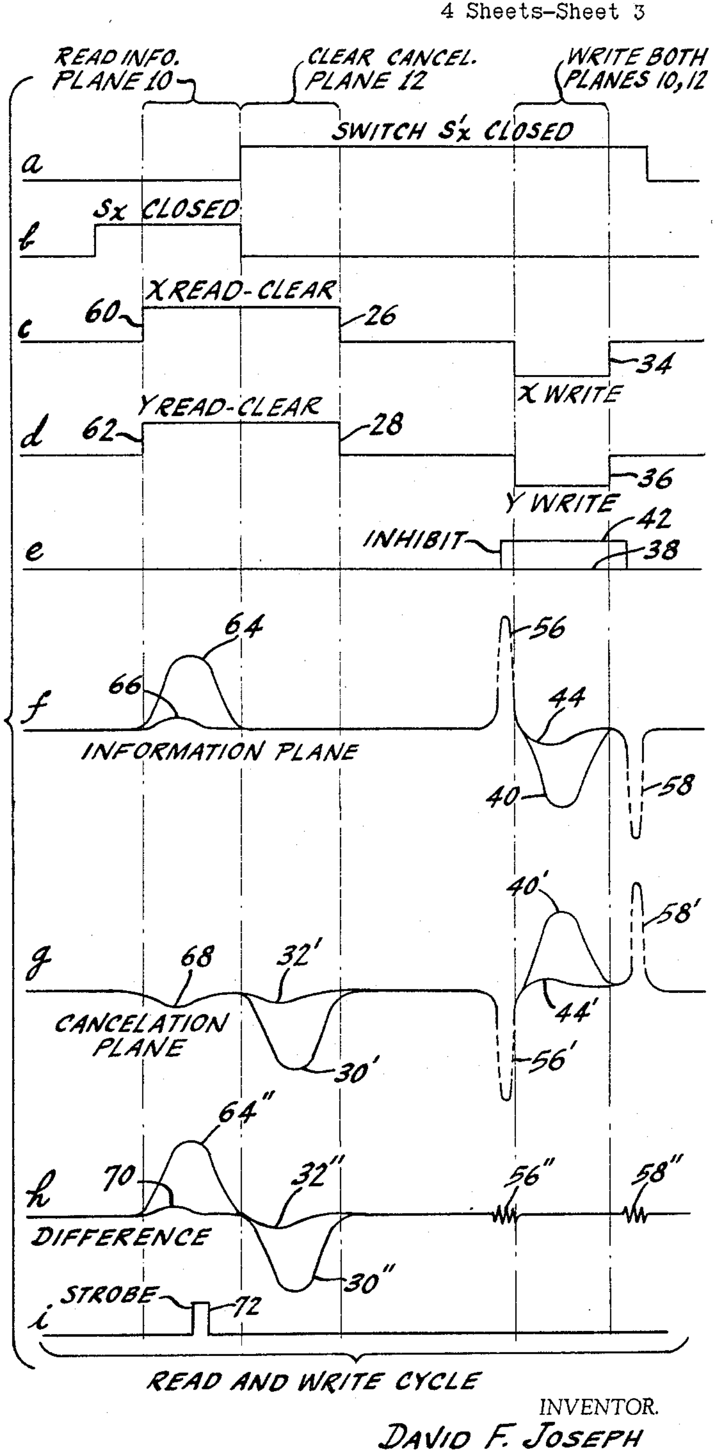
FIG. 5 is a series of waveforms which will be referred to in describing the operation of the system of FIG. 1 in the read and write mode.

FIG. 5 shows the waveforms in the system of FIG. 1 when operated in a read and write mode wherein information is read from a memory location and then different information is written back into the same memory location. Information in the memory location is read out from the information plane 10 exactly as has been described with respect to the read portion of the read and restore cycle. The portions of the waveforms in FIG. 5 during the read operation are given the same numerals as are used for corresponding portions of the waveforms in FIG. 2.

After the information in the information plane has been read out, the switch S*x* is opened and the switch S'*x* is closed. The X read pulse 60 is continued as an X clear pulse 26, and the Y read pulse 62 is continued as a Y clear pulse 28. The changed switch positions cause the X and Y clear pulses 26 and 28 to be directed on to the noise cancellation plane 12 where they clear the selected memory location in the cancellation plane. The X and Y clear pulses 26 and 28 cause signals 32' or 30' (FIG. 5*g*) to be induced in the sense winding *s*, which are not cancelled, but are applied as signals 32'' and 30'' (FIG. 5*h*) to the unstrobed and inactive sense amplifier.

Now that the information has been destructively read out of the information plane, and the same information has been cleared from the noise cancellation plane, new information can be written into both planes in the manner that has been described in connection with the write portion of the clear and write cycle. The portions of the waveforms of FIG. 5 during the write operation are given the same numerals as are used for corresponding portions of the waveforms in FIG. 2.

DESCRIPTION OF SYSTEM OF FIG. 6

Figure 6:
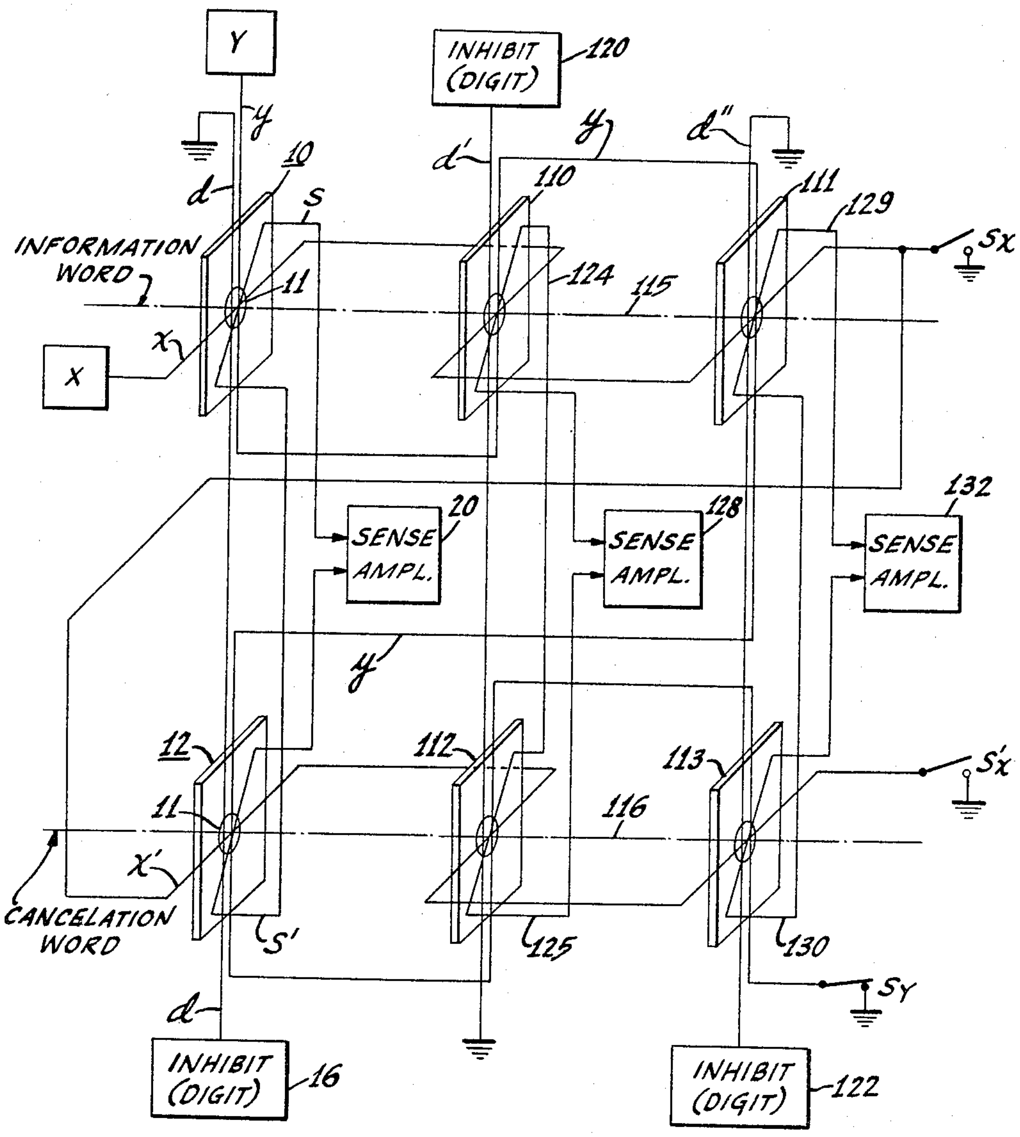
FIG. 6 is a simplified diagrammatic representation of an extension of the on-digit system of FIG. 1 to an illustrative memory having word locations for words of three information bits (digits) each.

FIG. 6 illustrates an extension of the one-digit system of FIG. 1 to a three-dimensional memory having word locations for words of three information bits each. The information plane 10 and the noise cancellation plane 12 in FIG. 6 corresponds with the similarly designated planes in FIG. 1. In FIG. 6 only one memory element is shown in each of the planes 10 and 12, so as not to destroy the clarity of illustration. Information planes 110 and 111 are used for the storage of second and third information bits, respectively, along several imaginary word lines such as the word line 115. Similarly, the noise cancellation planes 112 and 113 are for the second and third bits or digits, respectively, of noise cancellation words such as the one along the imaginary line 116.

The broken line portions 14 of each of the *x* or row conductors in FIG. 1 are, in FIG. 6, extended through corresponding rows of information planes 110 and 111 before reaching the corresponding grounding switch S*x*. Similarly, the row conductors *x′* are extended through the noise cancellation planes 112 and 113 before reaching the grounding switch S′*x*. The broken line portions 15 of each of the *y* or column conductors in FIG. 1 are, in FIG. 6, extended through corresponding columns of information planes 110 and 111, and through corresponding columns of noise cancellation planes 112 and 113.

The information plane 110 and its corresponding noise cancellation plane 112 are provided with an individual inhibit or digit driver 120 which is like the digit driver 16, and is connected to a digit conductor *d′* like the digit conductor *d*. Similarly, the planes 111 and 113 are provided with an individual inhibit or digit driver 122, and an individual digit conductor *d″*.

The information plane 110 and the cancellation plane 112 are provided with a sense winding 124, 125 like sense winding *s* and *s′*, and a sense amplifier 128 like sense amplifier 20. Planes 111 and 113 likewise have sense windings 129, 130 and a sense amplifier 132.

OPERATION OF SYSTEM OF FIG. 6

In the operation of the three-dimensional memory arrangement of FIG. 6, the energization of one read-write driver X and one read-write driver Y results in the addressing of all information bit locations of a word such as a word along the imaginary line 115. If the corresponding switch S*x* is opened and the switch S′*x* is closed, the energization of the drivers X and Y results in the simultaneous addressing of all noise cancellation bits or digits along the imaginary cancellation word line 116.

The operation of the digit means and the sense means of planes 110 and 112 is the same as the operation of the digit means and sense means of planes 10 and 12, which have been described in connection with FIG. 1. Similarly, the digit sense operation of the planes 111 and 113 is as has been described.

What is claimed is:

A three-dimensional coincident-current random-access memory system, comprising a plurality of information digit planes each including memory elements arranged in rows and columns, a corresponding plurality of noise cancellation digit planes each including memory elements arranged in rows and columns, a plurality of row selection conductors each linking a corresponding row of memory elements in all of said information and cancellation digit planes, a plurality of column selection conductors each linking a corresponding column of memory elements in all of said information digit planes and said cancellation digit planes, a digit winding for each pair of information and cancellation digit planes, each digit winding linking all memory elements in a respective pair of digit planes, a sense winding for each pair of information and cancellation digit planes, each sense winding linking all memory elements in a respective pair of digit planes, driver and switch means operative when writing to apply a row selection current pulse through a selected one of said row selection conductors linking corresponding rows of memory elements in all of said information and cancellation digit planes, and operative when reading to apply a row selection current pulse through solely a portion of a row selection conductor linking corresponding rows of memory elements in all of said information digit planes, and driver means operative both when writing and when reading to apply a column selection current pulse through a selected one of said column selection conductors linking a corresponding column of memory elements in all of said information and cancellation digit planes.

References Cited by the Examiner

UNITED STATES PATENTS

| | | | |
|---|---|---|---|
| 2,897,482 | 7/1959 | Rosenberg ---------- | 340—174 |
| 3,208,054 | 9/1965 | Kaiseo et al. -------- | 340—174 |
| 3,215,992 | 11/1965 | Schallerer ---------- | 340—174 |

BERNARD KONICK, *Primary Examiner.*

S. URYNOWICZ, *Assistant Examiner.*